(12) United States Patent
Nisimoto et al.

(10) Patent No.: US 6,688,898 B2
(45) Date of Patent: *Feb. 10, 2004

(54) ROTARY CONNECTOR (75) Inventors: Takuya Nisimoto, Tokyo (JP); Hajime Watanabe, Tokyo (JP); Michihiro Shimada, Tokyo (JP); Masahiro Hasegawa, Tokyo (JP)

(73) Assignee: Furukawa Electric Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,797

(22) PCT Filed: Nov. 27, 1998

(86) PCT No.: PCT/JP98/05353
§ 371 (c)(1),
(2), (4) Date: Sep. 13, 1999

(87) PCT Pub. No.: WO99/29004
PCT Pub. Date: Jun. 10, 1999

(65) Prior Publication Data
US 2002/0019169 A1 Feb. 14, 2002

(30) Foreign Application Priority Data
Nov. 28, 1997 (JP) .............................. 9-327802

(51) Int. Cl.[7] .............................................. H01R 39/02
(52) U.S. Cl. ........................................ 439/164; 439/15
(58) Field of Search ......................... 439/15, 164, 283; 29/882, 874, 825, 749, 885, 872

(56) References Cited

U.S. PATENT DOCUMENTS

| | | | | |
|---|---|---|---|---|
| 4,438,230 A | * | 3/1984 | Schwarz | 525/151 |
| 4,470,195 A | * | 9/1984 | Lang | 29/825 |
| 5,003,126 A | * | 3/1991 | Fujii et al. | 174/36 |
| 5,201,903 A | * | 4/1993 | Corbett, III et al. | 29/872 |
| 5,310,356 A | * | 5/1994 | Obata et al. | 439/164 |
| 5,882,216 A | * | 3/1999 | Matsumoto et al. | 439/164 |
| 6,166,160 A | * | 12/2000 | Ngoc | 526/329.3 |
| 6,294,604 B1 | * | 9/2001 | Focquet et al. | 524/433 |

* cited by examiner

*Primary Examiner*—Alexander Gilman
(74) *Attorney, Agent, or Firm*—Lorusso, Loud & Kelly (57) ABSTRACT This invention relates to a rotating connector comprising an inner cylinder 2 and an outer cylinder 3 combined together to permit the relative rotation in a concentric state, and a flat cable 1 spirally housed in an annular space 20 formed between the inner cylinder 2 and the outer cylinder 3, and connected at its inner end to the inner cylinder 2 while being connected at its outer end to the outer cylinder 3, wherein the flat cable 1 is composed of a plurality of flat-type conductors 10 placed in parallel arrangement and an insulating coat layer 11 placed over the flat-type conductors 10, and the insulating coat layer 11 is formed by coating the flat-type conductor 10 with a thermoplastic resin by means of direct extrusion.

According to the present invention, since the insulating coat layer 11 of the flat cable 1 is formed by coating the flat-type conductors 10 with the thermoplastic resin by means of direct extrusion as described above, it is possible to provide a rotating connector, which permits the smooth rotation without an increase in torque even in the high-temperature environment and is excellent in durability.

4 Claims, 8 Drawing Sheets

ROTARY CONNECTOR

TECHNICAL FIELD

This invention generally relates to a rotating connector and, more particularly, to a rotating connector for use in a steering device for a vehicle, for instance, or like rotating connector for electrically connecting an inner cylinder side (a steering shaft side) and an outer cylinder side (a column side) which are combined together to permit the relative rotation in a substantially concentric state.

BACKGROUND ART

A rotating connector of this kind is composed of an inner cylinder and an outer cylinder which are combined together to permit the relative rotation in a substantially concentric state, and a flat cable which is housed spirally in an annular space formed by the inner cylinder and the outer cylinder and is connected at its inner end to the inner cylinder while being connected at its outer end to the outer cylinder.

In such a rotating connector, when the inner cylinder is rotated to unroll the spirally-rolled flat cable on condition that the outer cylinder is fixed in position, for instance, the flat cable makes the biased movement toward the outer cylinder resulting from the expansion of a roll diameter of the flat cable, or alternatively, when the inner cylinder is rotated in the reverse direction, the flat cable makes the biased movement toward the inner cylinder resulting from the reduction of the roll diameter. Thus, the inner cylinder and the outer cylinder are made relatively rotatable within the range from the position of the flat cable maximally biased toward the inner cylinder to the position of the flat cable maximally biased toward the outer cylinder.

Figure 11:
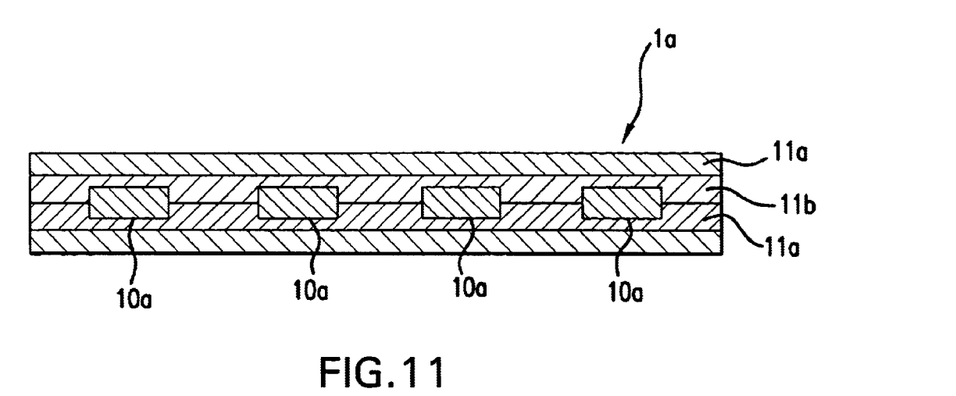
FIG. 11 is an enlarged cross-sectional view showing a flat cable of a rotating connector in a prior art.

As shown in FIG. 11, a flat cable 1a heretofore used in the rotating connector of this kind has been formed by coating sheet-shaped flat-type conductors 10a placed in parallel arrangement with an insulating film 11a consisting of a polyethylene terephthalate film through an adhesive resin layer 11b such as a saturated polyester copolymer, for instance.

Figure 12:
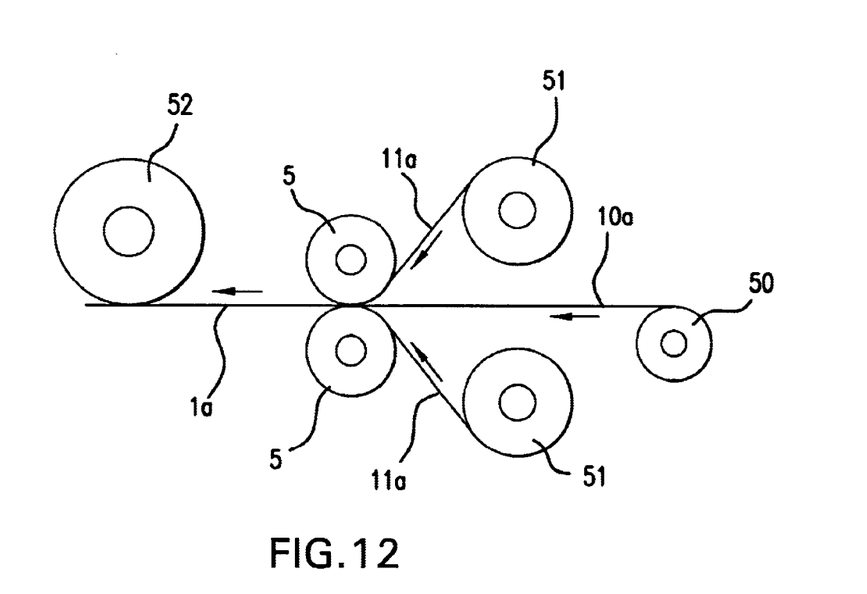
FIG. 12 is a schematic front view showing an apparatus for manufacturing the flat cable of FIG. 11.

The flat cable 1a is continuously manufactured as shown in FIG. 12, for instance, according to the steps of feeding the insulating films 11a, 11a respectively having the adhesive resin layers 11b on the inside by means of delivery rolls 51, 51, while feeding the foiled flat-type conductors 10a in the state of parallel arrangement by means of a bobbin 50, and then thermally bonding the insulating films 11a, 11a to the flat-type conductors 10a under pressure by means of heated machine rolls 5, 5, and the manufactured flat cable 1a is rolled round a take-up drum 52 in sequence.

The flat cable 1a rolled round the take-up drum 52 is cut in a predetermined length and is then incorporated into the housing as described above in the rotating connector.

Owing to the use of the flat cable 1a as described above, the rotating connector in the prior art has such disadvantages in that the adhesive resin layer 11b is forced out from a cut end surface of the flat cable 1a particularly in the high-temperature environment to prevent the rotation of the inner cylinder relative to the outer cylinder (an increase in torque occurs to make the rotation impossible in the worst case), and besides, softening of the adhesive resin layer 11b occurs to degrade the durability.

Further, the flat cable 1a makes the movement to enlarge a roll (i.e., to expand the roll diameter) or to narrow the roll (i.e., to reduce the roll diameter) in accordance with the rotation of the inner cylinder, for instance, while the opposite widthwise ends of the flat cable 1 are formed in an angular shape, and therefore, friction between the opposite widthwise ends of the flat cable 1a and the inner wall surface of the space causes large rotational noise at the time of rotating the inner cylinder.

It is an object of the present invention to provide a rotating connector which permits the smooth rotation of an inner cylinder or an outer cylinder even in the high-temperature environment and is excellent in durability.

Another object of the present invention is to provide a rotating connector which permits less rotational noise caused by a friction between the opposite widthwise ends of a flat cable and an inner wall surface of a space at the time of rotating the inner cylinder or the outer cylinder.

DISCLOSURE OF THE INVENTION

For attaining the above objects, a rotating connector according to the present invention has the following structure.

That is, a rotating connector with improved capability to withstand repeated alternating rotation in forward and reverse rotating directions according to the fist mode of the present invention comprises an inner cylinder 2 and an outer cylinder 3 combined together to permit the relative rotation in a concentric state, and a flat cable 1 spirally housed in an annular space 20 formed between the inner cylinder 2 and the outer cylinder 3, and connected at its inner end to the inner cylinder 2 while being connected at its outer end to the outer cylinder 3, wherein the flat cable 1 is composed of a plurality of flat-type conductors 10 placed in parallel arrangement and an insulating coat layer 11 placed over the flat-type conductors 10, and the insulating coat layer 11 is formed by coating the flat-type conductors 10 with a thermoplastic resin by means of direct extrusion.

A rotating connector with improved capability to withstand repeated alternating rotation in forward and reverse rotating directions according to the second mode of the present invention comprises an inner cylinder 2 and an outer cylinder 3 combined together to permit the relative rotation in a concentric state, and a flat cable 1 spirally housed in an annular space 20 formed between the inner cylinder 2 and the outer cylinder 3 in the mode of forming a portion of the flat cable into an U turn-shaped reversing part 12, and connected at its inner end to the inner cylinder 2 while being connected at its outer end to the outer cylinder 3, wherein the flat cable 1 is composed of a plurality of flat-type conductors 10 placed in parallel arrangement and an insulating coat layer 11 placed over the flat-type conductors 10, and the insulating coat layer 11 is formed by coating the flat-type conductors 10 with a thermoplastic resin by means of direct extrusion.

A rotating connector with improved capability to withstand repeated alternating rotation in forward and reverse rotating directions according to the third mode of the present invention comprises an inner cylinder 2 and an outer cylinder 3 combined together to permit the relative rotation in a concentric state, a flat cable 1 spirally housed in an annular space 20 formed between the inner cylinder 2 and the outer cylinder 3 in the mode of forming a portion of the flat cable into an U turn-shaped reversing part 12, and connected at its inner end to the inner cylinder 2 while being connected at its outer end to the outer cylinder 3, and at least one flat dummy cable 6 spirally housed in the space 20 to be rolled in parallel to the flat cable 1 in the mode of forming a portion of the flat dummy cable into an U turn-shaped reversing part 6, and connected at its inner end to the inner cylinder 2 while being connected at its outer end to the outer cylinder 3, wherein the flat cable 1 is composed of a plurality of flat-type conductors 10 placed in parallel arrangement and an insulating coat layer 11 placed over the flat-type conductors 10, and the insulating coat layer 11 is formed by coating the flat-type conductors 10 with a thermoplastic resin by means of direct extrusion.

A rotating connector with improved capability to withstand repeated alternating rotation in forward and reverse rotating directions according to the fourth mode of the present invention comprises an inner cylinder 2 and an outer cylinder 3 combined together to permit the relative rotation in a concentric state, a flat cable 1 spirally housed in an annular space 20 formed between the inner cylinder 2 and the outer cylinder 3 in the mode of forming a portion of the flat cable into an U turn-shaped reversing part 12, and connected at its inner end to the inner cylinder 2 while being connected at its outer end to the outer cylinder 3, and a plurality of rollers 7 provided within the space 20 so as to be located between an outer portion of the U turn-shaped reversing part 12 of the flat cable 1 and an inner portion of the U turn-shaped reversing part 12 thereof, wherein the flat cable 1 is composed of a plurality of flat-type conductors 10 placed in parallel arrangement and an insulating coat layer 11 placed over the flat-type conductors 10, and the insulating coat layer 11 is formed by coating the flat-type conductors 10 with a thermoplastic resin by means of direct extrusion.

A rotating connector with improved capability to withstand repeated alternating rotation in forward and reverse rotating directions according to the fifth mode of the present invention is characterized in that the opposite widthwise ends of the flat cable 1 in the rotating connector according to any one of the first to fourth modes described above are formed in the shape of a circular arc in section.

A rotating connector with improved capability to withstand repeated alternating rotation in forward and reverse rotating directions according to the sixth mode of the present invention is characterized in that the thermoplastic resin for the formation of the insulating coat layer 11 includes a polyamide resin.

BRIEF DESCRIPTION OF THE DRAWINGS

FIG. 4 is a view showing a flat cable for use in a rotating connector in each embodiment according to the present invention, wherein

BEST MODE OF EMBODYING THE INVENTION

Figure 1:
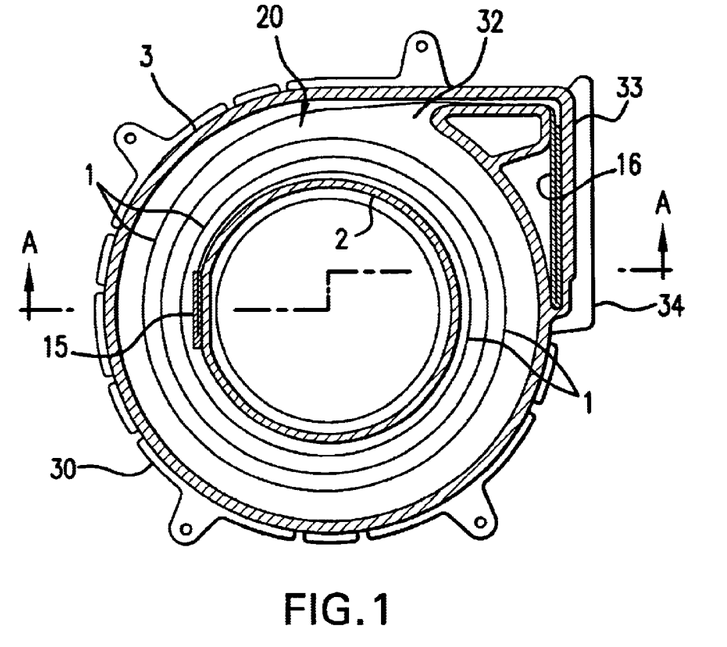
FIG. 1 is a cross-sectional plan view showing a rotating connector in one embodiment according to the present invention.
Figure 2:
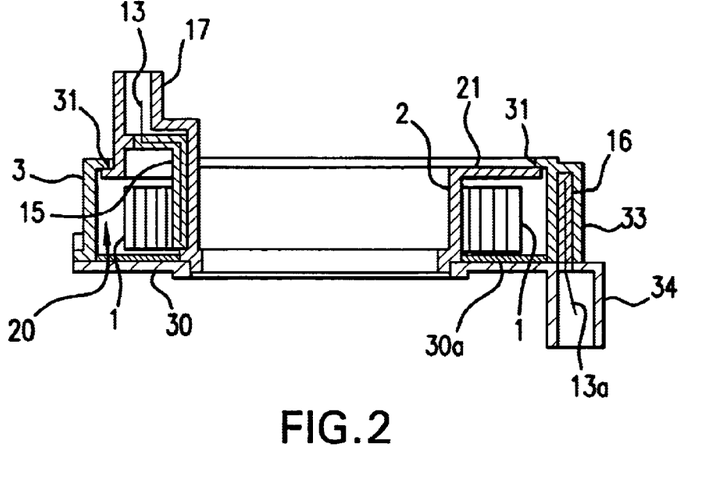
FIG. 2 is a longitudinal sectional view taken on line A—A indicated by arrows in the rotating connector of FIG. 1.

FIGS. 1 and 2 show a rotating connector in one embodiment according to the present invention, and the rotating connector in this embodiment is assembled as follows.

Reference numerals 2 and 3 respectively denote an inner cylinder and an outer cylinder both formed by an insulating resin or other insulating material. A flanged cover plate 21 is formed as one body at the outer periphery of an upper part of the inner cylinder 2, and the outer end of the cover plate 21 is anchored to the lower surface of an inner flange 31 formed at an upper part of the outer cylinder 3 to permit the relative rotation of the inner and outer cylinders 2, 3 in a concentric state.

Figure 3:
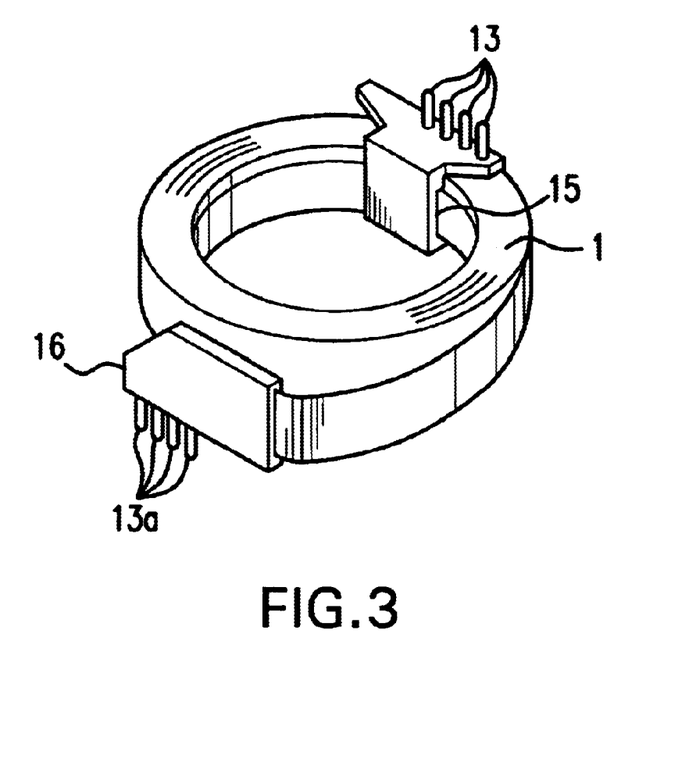
FIG. 3 is a perspective view showing a spirally-rolled flat cable for use in the rotating connector of FIG. 1.

After the outer end of the cover plate 21 is anchored to the inner flange 31 of the outer cylinder 3, a spirally-rolled flat cable 1 as shown in FIG. 3 is put in an annular space 20 formed between the inner cylinder 2 and the outer cylinder 3, and the inner end and the outer end of the flat cable 1 are respectively connected to the inner cylinder 2 and the outer cylinder 3.

As shown in FIGS. 1 to 3, the inner end and the outer end of the spirally-rolled flat cable 1 in this embodiment are respectively mounted with an inside connector piece 15 and an outside connector piece 16 both formed by an insulating resin to permit the insertion of the inner and outer ends respectively into the connector pieces, and lead wires 13 connected to the flat-type conductors 10 (See FIG. 4) of the flat cable 1 project upward from the inside connector piece 15, while lead wires 13a also connected to the flat-type conductors project downward from the outside connector piece 16.

The lower part of the inside connector piece 15 is fixed to a portion of the outer surface of the inner cylinder 2 by means of bonding, and each lead wire 13 of the inside connector piece 15 is adapted to project outward into a socket part 17 formed to project upward from a portion of the cover plate 21 of the inner cylinder 2. On the other hand, the outside connector piece 16 of the flat cable 1 is drawn out to the outside through a guide slit 32 formed in a portion of the outer cylinder 3 and is then forced in an insert part 33 formed at an outer part of the outer cylinder 3 in the vicinity of the guide slit 32.

Subsequently, a resin-made damping sheet 30a is put on an annular bottom plate 30 formed by an insulating resin or other insulating material, and the outer edge of the lower part of the inner cylinder 2 is rotatably brought into contact with the inner edge of the bottom plate 30, while the outer edge of the lower part of the outer cylinder 3 is removably mounted to the outer edge of an upper part of the bottom plate 30. At the same time, each lead wire 13a projecting from the outside connector piece 16 is adapted to project from a downward socket part 34 formed at a portion of the outer part of the bottom plate 30.

Figure 4A:
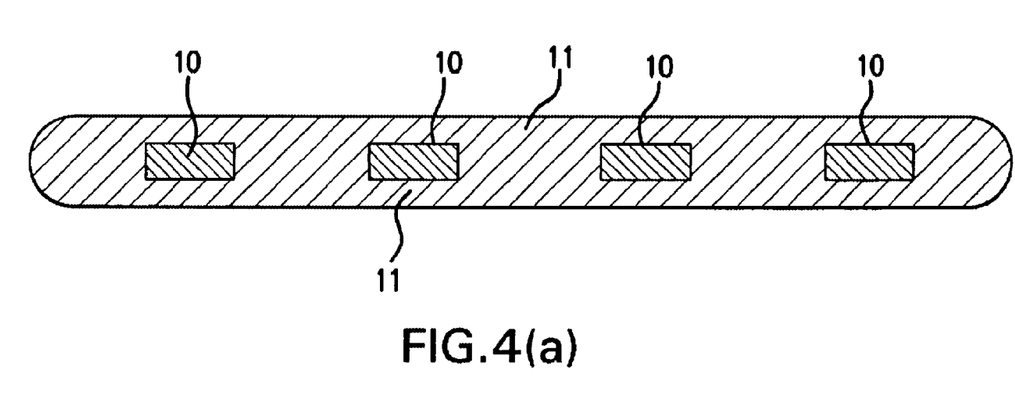
FIG. 4(a) is an enlarged cross-sectional view showing one embodiment of the flat cable.

As shown in FIG. 4(a), the flat cable 1 is composed of a plurality of foiled flat-type conductors 10 consisting of copper, copper alloy or the like and placed in parallel arrangement, and an insulating coat layer 11 placed over the flat-type conductors 10, and the insulating coat layer 11 is formed by coating the flat-type conductors 10 with a thermoplastic resin by means of direct extrusion. The opposite widthwise ends of the flat cable 1 are formed in the shape of a circular arc in section, as shown in FIG. 4(a).

Figure 8:
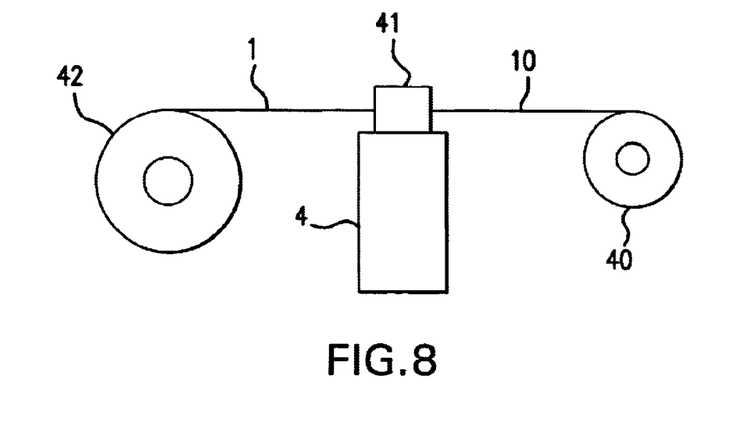
FIG. 8 is a schematic front view showing an apparatus for manufacturing the flat cable of FIG. 4(a)
Figure 9:
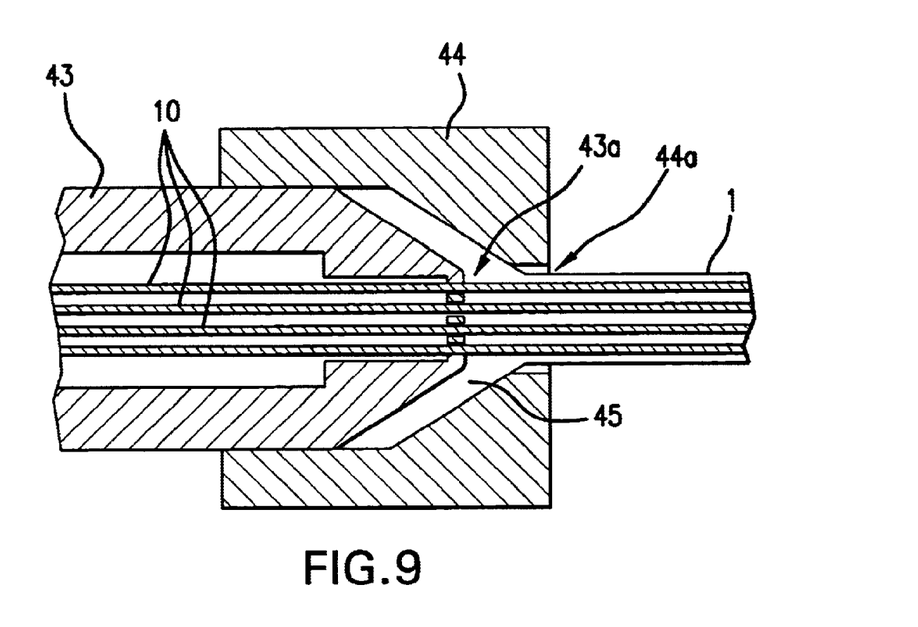
FIG. 9 is a partially enlarged cross-sectional plan view showing a cross head in the manufacturing apparatus of FIG. 8.
Figure 10:
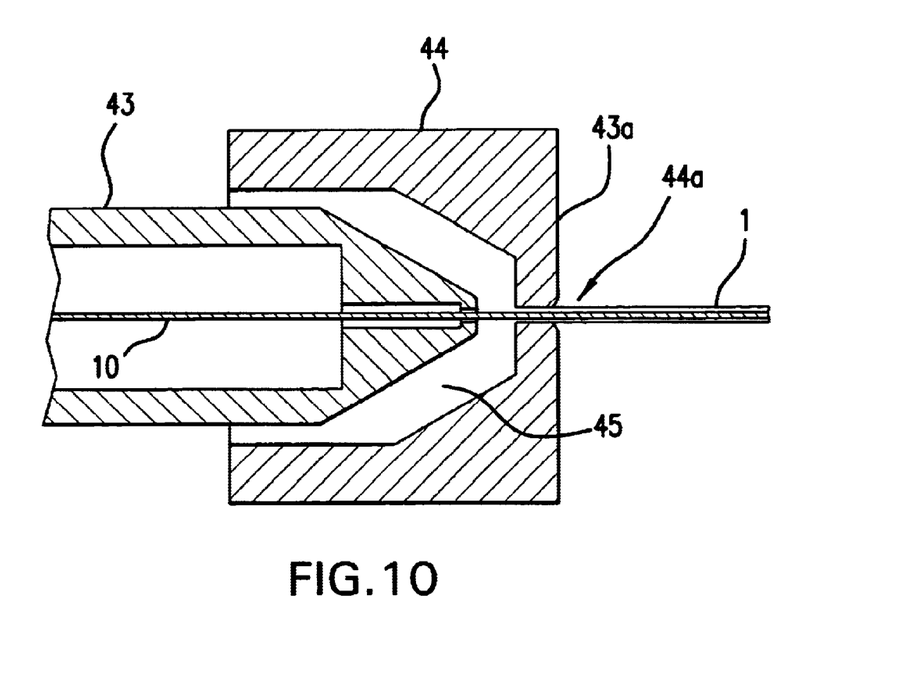
FIG. 10 is a longitudinal sectional view showing the cross head of FIG. 9.

The flat cable 1 in the above embodiment is manufactured by an apparatus as shown in FIGS. 8 to 10.

In FIG. 8, reference numeral 40 denotes a bobbin for feeding the flat-type conductors 10 at a predetermined pitch in the state of parallel arrangement, 4 is an extruder having a cross head 41 at the top, and 42 is a take-up roll for taking up the manufactured flat cable 1.

The plurality of flat-type conductors 10 fed in the state of parallel arrangement by means of the bobbin 40 are passed through an extrusion nipple 43 installed in the cross head 41 as shown in FIGS. 9 and 10, while being guided toward a die hole 44a of an extrusion die 44 through a nipple hole 43a formed in parallel to the extrusion nipple 43. Each flat-type conductor 10 guided to the die hole 44a is pushed out from the extrusion die 44 through the die hole 44a together with a molten thermoplastic resin 45 forced in the cross head 41, and the flat cable 1 resulting from coating the parallel-arranged flat-type conductors 10 with the insulating coat layer 11 as one body is manufactured, as shown in FIG. 4(a). The manufactured flat cable 1 is sequentially rolled round the take-up roll 42 after subjected to air cooling.

In the case of manufacturing the flat cable 1 according to the above process, the flat cable 1 may be subjected to water bath or hot-water bath to adjust the temperature of the flat cable 1 rolled round the take-up roll 42, whenever the insulating coat layer 11 of the flat cable 1 extruded from the extruder 4 is solidified to a certain degree.

Further, a preheating device (not shown) may be installed between the bobbin 40 and the cross head 41 as shown in FIG. 8 to preheat the flat-type conductors 10 before the feed of the flat-type conductors to the cross head 41.

Furthermore, if the flat-type conductors 10 are coated with the insulating coat layer 11 by means of extrusion after the application of a silane coupling agent to the surface of each flat-type conductor 10, the mutual adhesiveness between each flat-type conductor 10 and the insulating coat layer 11 may be improved to provide higher flexibility for the flat cable 1.

According to the rotating connector in the above embodiment, firstly, since each flat-type conductor 10 of the flat cable 11 is coated with the insulating coat layer 11 consisting of the thermoplastic resin by means of direct extrusion, and as a result, each flat-type conductor 10 and the insulating coat layer 11 are formed as one body, there is no possibility that the resin layer is forced out from the cut end surface of the flat cable 1 in the high-temperature environment to prevent the rotation of the inner cylinder 2 relative to the outer cylinder 3 in the case of making such relative rotation.

Secondly, since the opposite widthwise ends of the flat cable 1 are formed in the shape of a circular arc in section, it is possible to restrain rotational noise caused by the friction between the flat cable and the inner wall surface of the space 20.

Thirdly, since any adhesive resin is not used for the insulating coat layer 11 of the flat cable 1, it is possible to restrain the occurrence of softening in the high-temperature environment, and higher durability is ensured.

Figure 4B:
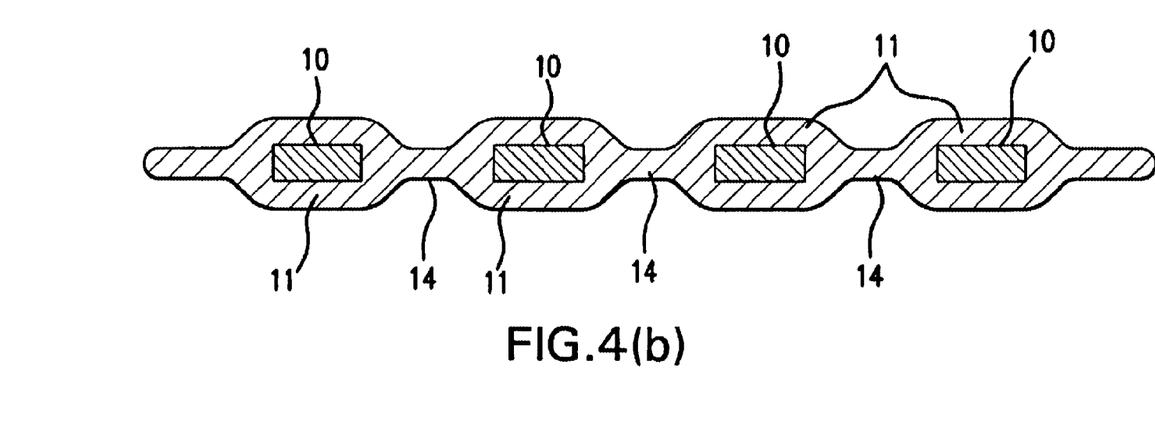
FIG. 4(b) is an enlarged cross-sectional view showing another embodiment of the flat cable.

FIG. 4(b) shows a flat cable 1 in another embodiment, and an insulating coat layer 11 of the flat cable 1 in this embodiment has thin portions 14, which are smaller in thickness than that in the embodiment shown in FIG. 4(a), between the adjacent flat-type conductors 10 and at the opposite ends of the flat cable 1. Owing to the formation of the thin portions 14 between the adjacent flat-type conductors 10 and at the opposite ends of the flat cable, the flat cable 1 in this embodiment permits a reduction in weight and may use less quantity of the thermoplastic resin for the formation of the insulating coat layer 11, resulting in a reduction in cost.

The flat cable 1 as shown in FIG. 4(b) may be manufactured by the use of an extrusion die 44 having a die hole 44a of a shape substantially similar to the sectional shape of the flat cable 1 as shown in FIG. 4(b). Otherwise, this flat cable may be manufactured also by the steps of adjusting the quantity of molten resin (the thermoplastic resin) extruded into the cross head 41 having the extrusion die 44 and the extrusion nipple 43 both similar in constitution to those shown in FIGS. 9 and 10, and then subjecting the molten resin to natural shrinkage after coating the flat-type conductors 10 with the molten resin.

Preferably, as the flat-type conductors 10 according to the present invention, oxygen-free copper, copper phosphate, tough pitch copper, tin-plated copper and nickel-plated copper or the like may be used, and conductors formed by cutting foils of these coppers in a predetermined length or rolling a round wire material are in use.

The width, thickness and number of the flat-type conductors 10 are determined depending on the purpose of the flat cable 1 or other conditions, while the flat-type conductors 10 in the same flat cable 1 do not always need to be equal in width and thickness.

Preferably, as the thermoplastic resin for the formation of the insulating coat layer 11, extrusion-enable resins selected to withstand repeated flexing without breaking such as polyamide resin, polyolefin resin, polyester resin, PBT (polybutylene terephthalate) or the like may be used, and the polyamide resin among these thermoplastic resins is best suited from the viewpoint of durability.

The polyamide resin belongs to a high polymer generally having a peptide bond (—CONH—) as repeated units, and examples of the polyamide resin include a ring-opening polymer such as ε-caprolactam and ε-laurolactam, a polycondensation polymer of diamine such as hexamethylenediamine, metaxylylenediamine, 2,4,4- or 2,2,4-trimethylhexamethylenediamine with dibasic acid such as adipic acid, sebacic acid, dodecadionic acid and terephthalic acid and polycondensation polymer of aminocarboxylic acid such as 11-aminoundecanoic acid and 12-aminododecanoic acid on the basis of the form of polymerization. These polymers are normally called nylon. Preferably, nylon 6, nylon 66, nylon 610, nylon 12, nylon 11, nylon 46, nylon MXD-6, nylon 6/66 and nylon 106 or the like may be used, and nylon 12 and nylon 11 among these nylons are particularly suited from the viewpoint of water absorption.

EXAMPLE

The manufacturing apparatus as shown in FIGS. 8 to 10 was used to manufacture the flat cable 1 having a width of 8 mm and a thickness of 315 μm and similar in sectional shape to that shown in FIG. 4(a) by the steps of feeding four pieces of flat-type conductors 10 consisting of tough pitch copper having a width of 1.0 mm and a thickness of 140 μm, in the state of parallel arrangement from the bobbin 40, forcing nylon 12 ([dieamideL2140] made by Diselhuls Co., Ltd) in the cross head 41 at a temperature of 240° C., while continuously feeding the flat-type conductors to the cross head 41 in the manner of adjusting the interval of these flat-type conductors to 1.0 mm by means of the guide (not shown), then coating the flat-type conductors 10 with the nylon 12 by means of direct extrusion and air-cooling the resultant.

Ten samples of rotating connectors in the example according to the present invention were manufactured by the steps of cutting the flat cable 1 in a length of 3,500 mm and then mounting the resultant flat cable 1 in the space 20 of the housing formed by combining the inner cylinder 2 and the outer cylinder 3 together to permit the relative rotation as shown in FIGS. 1 and 2.

Comparative Example

A manufacture line as shown in FIG. 12 was used to manufacture a flat cable 1a having a width of 8 mm and a thickness of 316 μm and similar in sectional shape to that shown in FIG. 11 by the steps of feeding four pieces of flat-type conductors 10a consisting of tough pitch copper having a width of 1.0 mm and a thickness of 140 μm in the state of parallel arrangement from the bobbin 50, feeding an insulating film 11a consisting of polyethyleneterephthalate having a thickness of 38 μm and laminated on the inside with an adhesive resin layer consisting of a saturated polyester copolymer having a thickness of 50 μm, from the delivery rolls 51, 51, while continuously feeding these flat-type conductors to the machine rolls 51, 51 in the manner of adjusting the interval of the flat-type conductors to 1.0 mm by means of the guide (not shown), and then thermally bonding the insulating films 11a, 11a to the opposite surfaces of the flat-type conductors 10a under pressure on condition that the surface temperature and the surface pressure of the machine rolls 5, 5 are respectively held at 150° C. and 5 Kg/cm².

Ten samples of rotating connectors in to the comparative example of the prior art were manufactured by the steps of cutting this flat cable 1a in a length of 3,500 mm and then mounting the resultant flat cable in the space 20 of the housing formed by combining the inner cylinder 2 and the outer cylinder 3 to permit the relative rotation as shown in FIGS. 1 and 2.

Three kinds of tests for comparison were made on the samples of the rotating connectors in the example and the samples of the rotating connectors in the comparative example as follows.

(1) Measurement of Torque After Still-standing at High Temperature

After the above two kinds of rotating connector samples have been allowed to stand for 24 hours in a thermostat at the atmosphere of 105° C. and have been taken out from the thermostat to return the temperature of these samples to room temperature, the maximum value of the torque resulting from rotating the inner cylinder 2 of each of the above two kinds of rotating connector samples was measured.

(2) Measurement of Rotational Noise

The rotational noise resulting from rotating the inner cylinder 2 of each of the above two kinds of rotating connector samples at a speed of 1 rps twice at a time in the normal and reverse directions was measured in a sound measurement room.

(3) Measurement of Durability in High-temperature Environment

The speed of rotation as of the point of disconnection of the flat-type conductors of the flat cable of each of the above two kinds of rotating connector samples was measured on condition that the above two kinds of rotating connector samples were put, together with a device for rotating the connectors, in the thermostat at the atmosphere of 105° C. to rotate each connector sample continuously at a speed of 1 rps twice at a time in the normal and reverse directions.

The results are reported in the following table. Incidentally, the average of the measured values on the rotating connectors on a ten-sample basis are shown in the following table 1.

As shown in Table 1, according to the samples in the example, any increase of torque was not found even in the environment at a temperature as high as 105° C., while an increase in torque occurred in case of the samples in the comparative example, that is, the rotating connectors in the prior art.

Incidentally, according to the samples in the comparative example, as the result of making an observation on each sample disassembled after the completion of the above test, this sample gave evidences of the adhesive resin layer having been adhered to the inner wall of the space in the rotating connector after having been forced out from the cut end surface of the flat cable.

Further, the results shown in Table 1 prove that each sample in the example permits less rotational noise produced at the time of actuation than that each sample in the comparative example, and is excellent in durability under the high-temperature environment.

TABLE 1

|  | Example | Comparative example |
|---|---|---|
| Torque after still-standing at high temperature | 0.5 kgf/cm² | 2.1 kgf/cm² |
| Rotational noise | 43 dB | 48 dB |
| Durability in high-temperature environment | 1,000,000 times or more | About 350,000 times |

Figure 5:
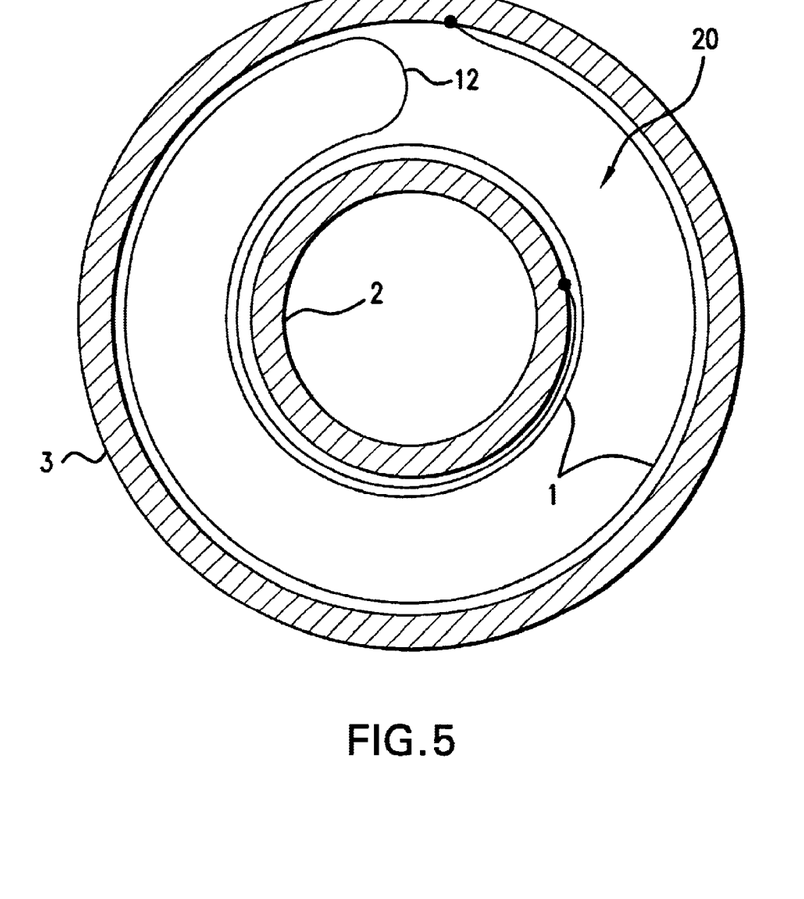
FIG. 5 is a schematic cross-sectional plan view showing a rotating connector in another embodiment according to the present invention.

FIG. 5 shows a rotating connector in another embodiment according to the present invention.

In the rotating connector in this embodiment, the flat cable 1 having a portion formed into an U turn-shaped reversing part 12 is spirally housed in the annular space 20 formed between the inner cylinder 2 and the outer cylinder 3, and the inner end of the flat cable 1 is connected to the inner cylinder 2, while the outer end thereof is connected to the outer cylinder 3.

The flat cable 1 is formed in the same manner as the flat cable described with reference to FIGS. 4(a) and (b).

When the inner cylinder 2 of the rotating connector in the embodiment shown in FIG. 5 is rotated counterclockwise relatively to the outer cylinder 3, the flat cable 1 is rolled tightly round the inner cylinder 2 in sequence, and at the same time, the U turn-shaped reversing part 12 is also moved counterclockwise to place the relative rotation of the inner and outer cylinders 2, 3 in the half canceled state, and as a result, the rotating connector in this embodiment permits less spiral turns (the length) of the flat cable 1 relatively to the speed of rotation of the inner and outer cylinders 2, 3.

Figure 6:
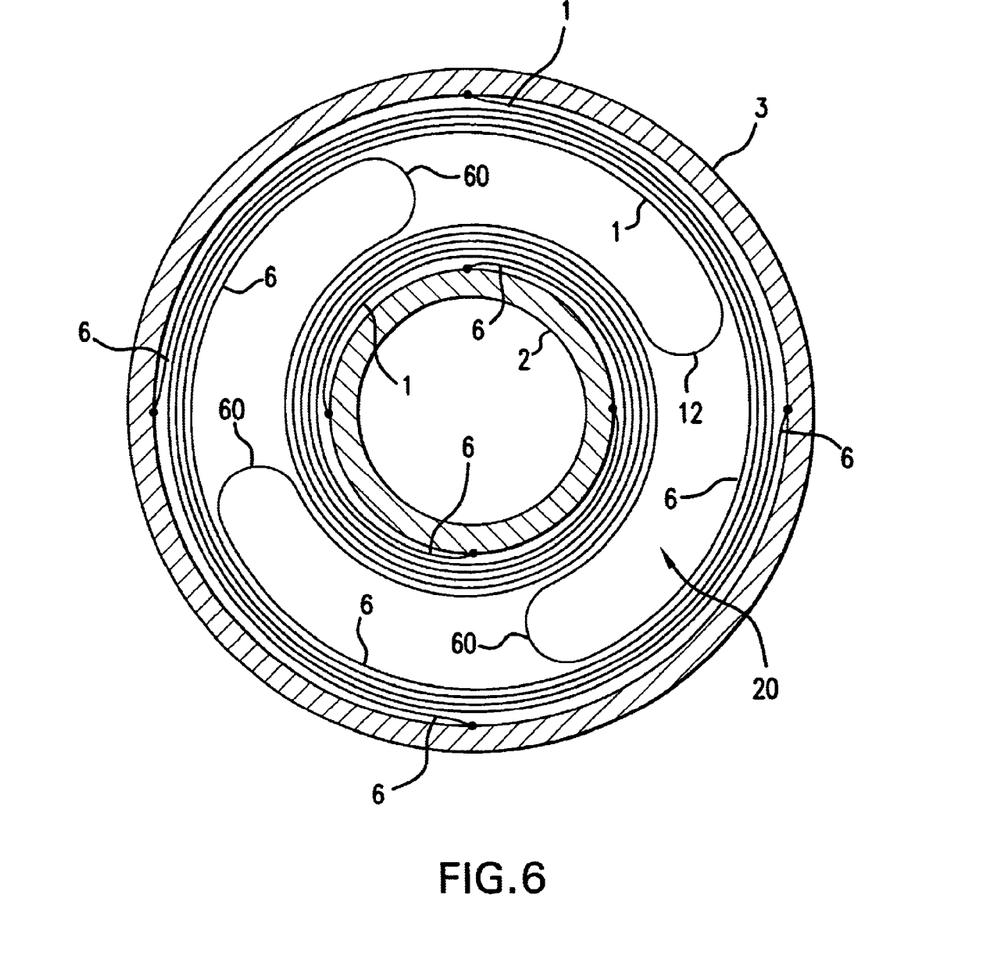
FIG. 6 is a schematic cross-sectional plan view showing a rotating connector in a further embodiment according to the present invention.

Other constitution, operation and effects of the rotating connector in the embodiment shown in FIG. 5 are similar to those of the rotating connector in the embodiment shown in FIGS. 1 and 2, and hence, their description will be omitted, FIG. 6 shows a rotating connector in a further embodiment according to the present invention.

In the rotating connector in this embodiment, the flat cable 1 having a portion formed into an U turn-shaped reversing part 12 is spirally housed in the annular space 20 formed between the inner cylinder 2 and the outer cylinder 3, and the inner end of the flat cable 1 is connected to the inner cylinder 2, while the outer end thereof is connected to the outer cylinder 3. In addition to the above structure, a plurality of flat dummy cables 6 each having a portion formed into an U turn-shaped reversing part 60 are spirally housed in the space 20 to be rolled in parallel to the flat cable 1, and the inner end of each dummy cable is connected to the inner cylinder 2, while the outer end thereof is connected to the outer cylinder 3. Each dummy cable 6 has the same length as the flat cable 1, and the U turn-shaped reversing part of the flat cable 1 and the U turn-shaped reversing part 60 of each dummy cable 6 are placed at substantially equal intervals.

The flat cable 1 and each dummy cable 6 are formed in the same manner as the flat cable described with reference to FIGS. 4(a) and 4(b).

When the inner cylinder 2 of the rotating connector in the embodiment shown in FIG. 6 is rotated counterclockwise relatively to the outer cylinder 3, the flat cable 1 is rolled tightly round the inner cylinder 2 in sequence, and at the same time, the U turn-shaped reversing part 12 is also moved counterclockwise to place the relative rotation of the inner and outer cylinders 2, 3 in the half canceled state, and as a result, the rotating connector of this embodiment permits less spiral turns (the length) of the flat cable 1 relatively to the speed of relative rotation of the inner and outer cylinders 2, 3.

Further, since each of the U turn-shaped reversing parts 12, 60 of the flat cable 1 and each dummy cable 5 shows elastic repulsive force caused by elastic deformation, and a distribution pattern of such U turn-shaped reversing parts 12, 60 arranged circumferentially at a plurality of places in the space 20 permits the inner side and the outer side of the U turn-shaped reversing part 12 of the flat cable 1 to be pressed respectively against the inner cylinder 2 and the outer cylinder 3 in the location of each of the U turn-shaped reversing parts 12, 60, the flat cable 1 may be restrained from loosening as of the point of rotation of the inner cylinder 2 or the outer cylinder 3, and the smooth movement of the U turn-shaped reversing part 12 is surely permitted in accordance with the rotation of the inner cylinder 2 or the outer cylinder 3.

Other constitution, operation and effects of the rotating connector in the embodiment shown in FIG. 6 are similar to those of the rotating connector in the embodiment shown in FIGS. 1 and 2, and hence, their description will be omitted.

Figure 7:
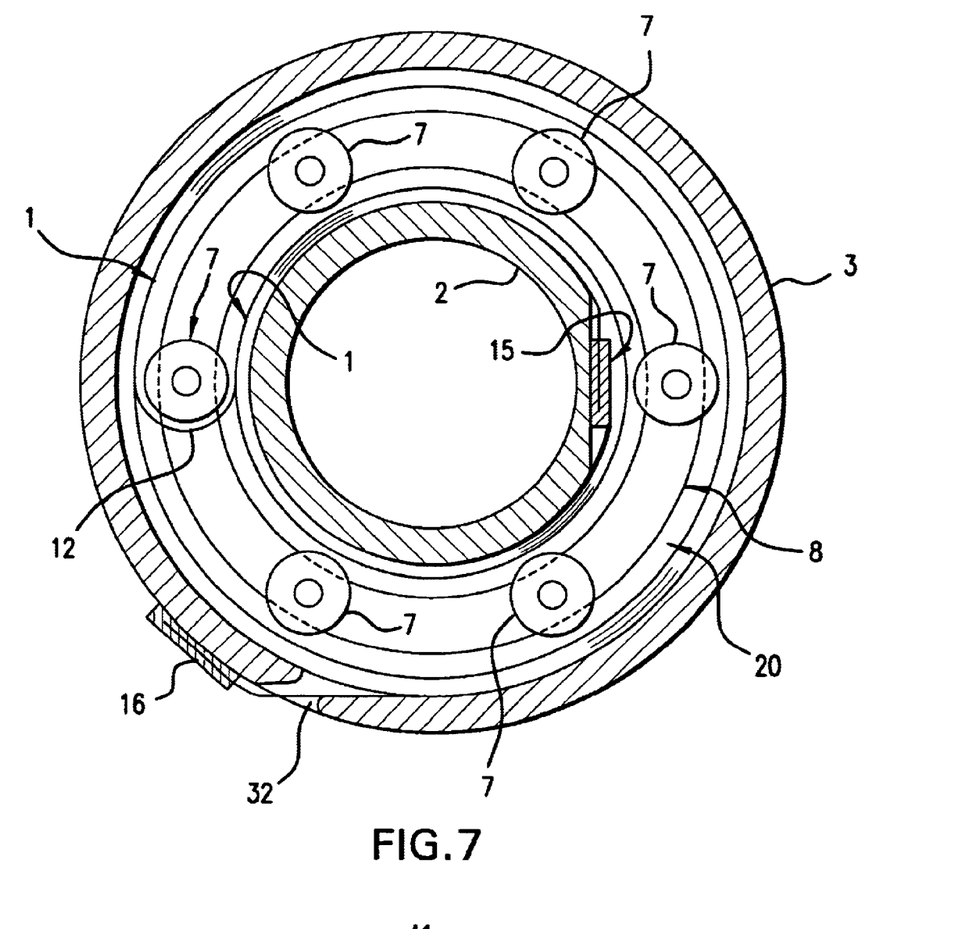
FIG. 7 is a schematic cross-sectional plan view showing a rotating connector in a still further embodiment according to the present invention.

FIG. 7 shows a rotating connector in a still further embodiment according to the present invention.

In the rotating connector in this embodiment, the flat cable 1 having a portion formed into an U turn-shaped reversing part 12 is spirally housed in the annular space 20 formed between the inner cylinder 2 and the outer cylinder 3, and the inside connector piece 15 at the inner end of the flat cable 1 is connected to the inner cylinder 2, while the outside connector piece 16 at the outer end thereof is connected to the outer cylinder 3.

A plurality of rollers 7 are arranged at substantially equiangular intervals between an outer portion and an inner portion of the U turn-shaped reversing part 12 of the flat cable 1, and each roller is rotatably mounted on a roller holder 2 placed on the inside of the bottom plate 30.

The flat cable 1 and each dummy cable 6 are formed in the same manner as the flat cable as described with reference to FIGS. 4(a) and 4(b).

When the inner cylinder 2 of the rotating connector in the embodiment shown in FIG. 7 is rotated clockwise relatively to the outer cylinder 3, the flat cable 1 is rolled tightly round the inner cylinder 2 in sequence, and at the same time, the U turn-shaped reversing part 12 is also moved clockwise to place the relative rotation of the inner and outer cylinders 2, 3 in the half canceled state, and as a result, the rotating connector of this embodiment permits less spiral turns (the length) of the flat cable relatively to the speed of relative rotation of the inner and outer cylinders 2, 3. Further, since the plurality of rollers 7 are arranged between the outer portion and the inner portion of the U turn-shaped reversing part 12 of the flat cable 1, the flat cable 1 is restrained from loosening, and the smooth movement of the U turn-shaped reversing part 12 is surely permitted in accordance with the rotation of the inner cylinder 2 or the outer cylinder 3.

Other constitution, operation and effects of the rotating connector in the embodiment shown in FIG. 7 are similar to those of the rotating connector in the embodiment shown in FIGS. 1 and 2, and hence, their description will be omitted.

Industrial Availability

In the rotating connector according to the present invention, since the flat cable 1 is formed by coating the arranged flat-type conductors 10 with the insulating coat layer 11 consisting of the thermoplastic resin by means of direct extrusion, and each flat-type conductor 10 and the insulating coat layer 11 are formed as one body, there is no possibility that the resin layer is forced out from the cut end surface of the flat cable in the high-temperature environment to prevent the rotation of the inner cylinder 2 relative to the outer cylinder 3 when making the relative rotation of the inner and outer cylinders.

Further, since any adhesive resin is not used for the coat layer of the flat cable 1, the occurrence of softening in the high-temperature environment may be restrained, and higher durability is ensured.

According to the rotating connector when the inner cylinder 2 is rotated counterclockwise relatively to the outer cylinder 3, the flat cable 1 is rolled tightly round the inner cylinder 2 in sequence, and at the same time, the U turn-shaped reversing part 12 is also moved counterclockwise to place the relative rotation of the inner and outer cylinders 2, 3 in the half canceled state, and as a result, this rotating connector permits less spiral turns (the length) of the flat cable 1 relatively to the speed of rotation of the inner and outer cylinders 2, 3.

According to the rotating connector when the inner cylinder 2 is rotated counterclockwise relatively to the outer cylinder 3, the flat cable 2 is rolled tightly round the inner cylinder 2 in sequence, and at the same time, the U turn-shaped reversing part 12 is also moved counterclockwise to place the relative rotation of the inner and outer cylinders 2, 3 in the half canceled state, and as a result, this rotating connector permits less spiral turns (the length) of the flat cable relatively to the speed of relative rotation of the inner and outer cylinders 2, 3. Further, since the U turn-shaped reversing parts 12, 60 of the flat cable 1 and each dummy cable 6 show the elastic repulsive force caused by the elastic deformation, and the distribution pattern of such U turn-shaped reversing parts 12, 60 circumferentially arranged at a plurality of places within the space 20 permits the inner side and the outer side of the U turn-shaped reversing part 12 of the flat cable 1 to be pressed respectively against the inner cylinder 2 and the outer cylinder 3 in the location of each of the U turn-shaped reversing parts 12, 60, the flat cable 1 may be restrained from loosening as of the point of rotation of the inner cylinder 2 or the outer cylinder 3, and the smooth movement of the U turn-shaped reversing part 12 is surely permitted in accordance with the rotation of the inner cylinder 2 or the outer cylinder 3.

According to the rotating connector when the inner cylinder 2 is rotated clockwise relatively to the outer cylinder 3, the flat cable 1 is rolled tightly round the inner cylinder 2, in sequence, and at the same time, the U turn-shaped reversing part 12 is also moved clockwise to place the relative rotation of the inner and outer cylinders 2, 3 in the half canceled state, and as a result, this rotating connector permits less spiral turns (the length) of the flat cable 1 relatively to the speed of relative rotation of the inner and outer cylinders 2, 3. Further, since the plurality of rollers 7 are arranged between the outer portion and the inner portion of the U turn-shaped reversing part 12 of the flat cable 1, the smooth movement of the U turn-shaped reversing part 12 is surely permitted in accordance with the rotation of the inner cylinder 2 or the outer cylinder 3.

According to the rotating connector since the opposite widthwise ends of the flat cable 1 are formed in the shape of a circular arc in section, it is possible to restrain the rotational noise caused by the friction between the flat cable 1 and the inner wall surface of the space 20.

According to the rotating connector since the thermoplastic resin for the formation of the insulating coat layer 11 of the flat cable 1 includes the polyamide resin, it is possible to provide a highly-durable rotating connector.

What is claimed is:

1. A rotating connector with improved capability to withstand repeated alternating rotation in forward and reverse rotating directions, comprising:

an inner cylinder and an outer cylinder combined together to permit relative rotation in a concentric state; and a flat cable spirally housed in an annular space formed between said inner cylinder and said outer cylinder, and connected at its inner end to said inner cylinder while being connected at its outer end to said outer cylinder;

wherein said flat cable is composed of a plurality of flat-type conductors placed in parallel arrangement and an insulating coal layer placed over said flat-type conductors; and said insulating coat layer is formed by embedding said flat-type conductors in a single layer of a thermoplastic resin by means of direct extrusion, said thermoplastic resin including a polyamide and being selected to withstand repeated flexing without breaking wherein said polyamide is selected from nylon-11 and nylon-12;

wherein said thermoplastic resin in said flat cable has a durability at a temperature of 105° C. equal to or greater than the durability of adhesively laminated polyethyleneterephthalate films enclosing a plurality of flat-type conductors.

2. A rotating connector with improved capability to withstand repeated alternating rotation in forward and reverse rotating directions, comprising:

an inner cylinder and an outer cylinder combined together to permit relative rotation in a concentric state; and a flat cable spirally housed in an annular space formed between said inner cylinder and said outer cylinder in the mode of forming a portion of the flat cable into an U turn-shaped reversing part, and connected at its inner end to said inner cylinder, while being connected at its outer end to said outer cylinder;

wherein said flat cable is composed of a plurality of flat-type conductors placed in parallel arrangement and an insulating coat layer placed over said flat-type conductors; and said insulating coat layer is formed by embedding said flat-type conductors in a single layer of a thermoplastic resin by means of direct extrusion, said thermoplastic resin including a polyamide and being selected to withstand repeated flexing without breaking;

wherein said polyamide is selected from nylon-11 and nylon-12;

wherein said thermoplastic resin in said flat cable has a durability at a temperature of 105° C. equal to or greater than the durability of adhesively laminated polyethyleneterephthalate films enclosing a plurality of flat-type conductors.

3. A rotating connector with improved capability to withstand repeated alternating rotation in forward and reverse rotating directions, comprising:

an inner cylinder and an outer cylinder combined together to permit relative rotation in a concentric state;

a flat cable spirally housed in an annular space formed between said inner cylinder and said outer cylinder in the mode of forming a portion of the flat cable into an U turn-shaped reversing part, and connected at its inner end to said inner cylinder while being connected at its outer end to said outer cylinder; and at least one flat dummy cable spirally housed in said space to be rolled in parallel to said flat cable in the mode of forming a portion of said flat dummy cable into an U turn-shaped reversing part, and connected at its inner end to said inner cylinder while being connected at its outer end to said outer cylinder;

wherein said flat cable is composed of a plurality of flat type conductors placed in parallel arrangement and an insulating coat layer placed over said flat-type conductors; and said insulating coat layer is formed by embedding said flat-type conductors in a single layer of thermoplastic resin by means of direct extrusion, said thermoplastic resin including a polyamide and being selected to withstand repeated flexing without breaking;

wherein said polyamide is selected from nylon-11 and nylon-12;

wherein said thermoplastic resin in said flat cable has a durability at a temperature of 105° C. equal to or greater than the durability of adhesively laminated polyethyleneterephthalate films enclosing a plurality of flat-type conductors.

4. A rotating connector with improved capability to withstand repeated alternating rotation in forward and reverse rotating directions, comprising:

an inner cylinder and an outer cylinder combined together to permit relative rotation in a concentric state;

a flat cable spirally housed in an annular space formed between said inner cylinder and said outer cylinder in the mode of forming a portion of the flat cable into an U turn-shaped reversing part, and connected at its inner end to said inner cylinder while being connected at its outer end to said outer cylinder; and a plurality of rollers provided in said space so as to be located between an outer portion of said U turn-shaped reversing part of said flat cable and an inner portion of said U turn-shaped reversing part of said flat cable;

wherein said flat cable is composed of a plurality of flat-type conductors placed in parallel arrangement and an insulating coat layer placed over said flat-type conductors; and said insulating coat layer is formed by embedding said flat-type conductors in a single layer of a thermoplastic resin by means of direct extrusion, said thermoplastic resin including a polyamide and being selected to withstand repeated flexing without breaking;

wherein said polyamide is selected from nylon-11 and nylon-12;

wherein said thermoplastic resin in said flat cable has a durability at a temperature of 105° C. equal to or greater than the durability of adhesively laminated polyethyleneterephthalate films enclosing a plurality of flat-type conductors.

* * * * *